United States Patent
Bormes (10) Patent No.: US 9,098,091 B2
(45) Date of Patent: Aug. 4, 2015

(54) PRESSURE REDUCER FOR A DEVICE FOR ENRICHING A LIQUID WITH CARBON DIOXIDE

(75) Inventor: Sascha Bormes, Kenn (DE)

(73) Assignee: LUXEMBOURG PATENT COMPANY S.A., Luxembourg (LU)

( * ) Notice: Subject to any disclaimer, the term of this patent is extended or adjusted under 35 U.S.C. 154(b) by 123 days.

(21) Appl. No.: 13/700,778

(22) PCT Filed: Jun. 3, 2011

(86) PCT No.: PCT/EP2011/059200
§ 371 (c)(1),
(2), (4) Date: Feb. 20, 2013

(87) PCT Pub. No.: WO2011/151444
PCT Pub. Date: Dec. 8, 2011

(65) Prior Publication Data
US 2013/0139910 A1 Jun. 6, 2013

(30) Foreign Application Priority Data
Jun. 3, 2010 (EP) ..................... 10164892

(51) Int. Cl.
*F16K 31/12* (2006.01)
*G05D 16/00* (2006.01)
(Continued)

(52) U.S. Cl.
CPC ............ *G05D 16/00* (2013.01); *F16K 1/307* (2013.01); *F16K 27/02* (2013.01); *G05D 16/10* (2013.01); *Y10T 137/7793* (2015.04)

(58) Field of Classification Search
CPC ..... G05D 16/00; G05D 16/10; G05D 16/103; F16K 1/307; F16K 27/02; Y10T 137/7793

USPC ........ 251/363, 368, 900; 137/505.42, 505.38, 137/505.39, 505.4, 505.41
See application file for complete search history.

(56) References Cited

U.S. PATENT DOCUMENTS

| 3,319,829 A | 5/1967 | Sentz |
| 4,659,061 A * | 4/1987 | Scheffel ................ 251/332 |

(Continued)

FOREIGN PATENT DOCUMENTS

| EP | 0428901 A1 | 5/1991 |
| EP | 1818749 A1 | 8/2007 |

(Continued)

OTHER PUBLICATIONS

International Preliminary Report on Patentability for corresponding International Application No. PCT/EP2011/059200 filed on Jun. 3, 2011; Mail date Dec. 6, 2012.

(Continued)

*Primary Examiner* — Jessica Cahill
(74) *Attorney, Agent, or Firm* — Cantor Colburn LLP (57) ABSTRACT

A pressure reducer includes a housing with an axially displaceable biased control body in order to close a connection between an inlet and an expansion chamber, where the housing is equipped with an axially displaceable biased actuating piston in order to displace the control body against the spring load of the control body as a function of the pressure in the expansion chamber and to open the connection, the housing being made of plastic, and the pressure reducer includes a separately made insert, where the insert is fixed between the inlet and the expansion chamber in the plastic housing and said insert has a guide bore, which is connected to the inlet and supports the control body, and a connecting bore, which adjoins the guide bore and which opens into the expansion chamber, where the insert forms an annular shoulder surface between the connecting bore and the guide bore, said shoulder surface interacting as a seating surface with the seal on the control body.

16 Claims, 4 Drawing Sheets (51) Int. Cl.
*F16K 1/30* (2006.01)
*F16K 27/02* (2006.01)
*G05D 16/10* (2006.01)

(56) References Cited

U.S. PATENT DOCUMENTS

| | | | |
|---|---|---|---|
| 5,640,997 A | 6/1997 | Reed | |
| 6,189,862 B1* | 2/2001 | McKay | 251/363 |
| 7,325,397 B2* | 2/2008 | Lee | 60/413 |
| 2003/0089462 A1* | 5/2003 | Wang | 160/107 |
| 2006/0169328 A1* | 8/2006 | Cho et al. | 137/505.42 |
| 2007/0204915 A1* | 9/2007 | Kimbara et al. | 137/495 |
| 2008/0105840 A1* | 5/2008 | Suzuki et al. | 251/62 |
| 2009/0314360 A1* | 12/2009 | Checiches et al. | 137/505 |

FOREIGN PATENT DOCUMENTS

| | | |
|---|---|---|
| FR | 1215097 A | 4/1960 |
| WO | 2006103533 A1 | 10/2006 |
| WO | 2009021960 A1 | 2/2009 |

OTHER PUBLICATIONS

International Search Report; International Application No. PCT/EP2011/059200; International Application Filing Date Jun. 3, 2011; Mail date Sep. 29, 2011.

\* cited by examiner

PRESSURE REDUCER FOR A DEVICE FOR ENRICHING A LIQUID WITH CARBON DIOXIDE

TECHNICAL FIELD

The present invention relates in general to a pressure reducer (also known as a pressure-reducing valve, pressure reduction valve or reducing valve) and specifically to a pressure reducer for use as a component of a device for enriching a liquid with gas, in particular for enriching drinking water with carbon dioxide.

BRIEF DISCUSSION OF RELATED ART

Devices for enriching beverages, in particular drinking water, with gas, in particular with carbon dioxide (also known as the carbonation of drinking water) have long been known. Drinking water is usually carbonated in a storage tank. Devices have recently been developed for enriching tap water with carbon dioxide using a "continuous flow method". Such devices are particularly suitable for use in domestic applications or in bars/restaurants. In the continuous flow method without a storage tank, carbonation proceeds in a continuous flow mixer which is directly connected to the drinking water pipe. In comparison with conventional devices with a storage tank, a device for carbonation by the continuous flow method without a storage tank is substantially more compact, more inexpensive and additionally also more hygienic. International patent application WO 2009/021960, for example, describes a device for enriching drinking water with carbon dioxide by the continuous flow method.

One important component of a such device is the pressure reducer which is connected to the carbon dioxide cylinder in order to supply the continuous flow mixer with $CO_2$ at a suitable pressure. One suitable pressure-reducing valve for controlling gas pressure as a function of water pressure is for example distributed by the ROTAREX Group under the name B0820.

European Patent EP 0 428 901 describes a pressure reducer of compact design which is likewise suitable in principle. The pressure reducer of EP 0428 901 takes the form of a cylinder valve and predetermines the output pressure depending on the setting.

The latter-stated pressure reducer comprises a housing with an inlet in a connection screw fitting for screwing to a $CO_2$ cylinder, and with an outlet in a further connection screw fitting. Between the inlet and outlet, the housing forms an expansion chamber. An axially displaceable control body is provided in the housing and biased in the closing direction. The control body comprises a seal which co-operates with a seat in order to provide leakproof closure of the connection between inlet and expansion chamber. An actuating piston is loaded by a second spring in order to displace the control body in the opening direction against the first spring as a function of the pressure in the expansion chamber.

It is quite conventional for valves which must be capable of withstanding a certain input pressure, such as for example also the pressure reducer according to EP 0428 901, to be designed with both a housing and a control body produced from metal. Brass, for example, is typically used as a material for the valve body.

It is now also known to produce pressure reducers with a valve housing which consists at least in part of plastic. Using plastic theoretically makes it possible not only to reduce material and processing costs but also to reduce the weight of the component. Such a valve is disclosed, for example, in U.S. Pat. No. 5,640,997. One drawback of plastic is in principle the short service life of the valve on exposure to severe loads. In addition, valves generally have to comply with certain safety requirements. U.S. Pat. No. 5,640,997 accordingly proposes providing the claimed surfaces with a metal coating. However, this has the drawback that any cost savings which might be achieved by using plastic to produce the housing must be partially or entirely sacrificed at least in part due to the necessary metal coating and the associated additional plant and equipment and method steps.

BRIEF SUMMARY

The disclosure proposes an improved development of a pressure reducer which permits less costly production while ensuring the least possible reduction in quality and safety of the pressure reducer.

The proposed pressure reducer is specifically developed for a device for enriching a liquid with gas, in particular for enriching drinking water with carbon dioxide. The pressure reducer comprises a housing with an inlet, an inlet port for connecting the pressure reducer to a gas vessel, an outlet, and an outlet port for connecting the pressure reducer to a continuous flow mixer. In the housing, an expansion chamber for expanding the enriching gas to a reduced pressure is provided in the flow path between inlet and outlet.

The pressure reducer comprises a control body arranged axially displaceably in the housing, which control body is biased in the closing direction by means of a first spring. The purpose of the control body is to permit controlled opening or closing of a connection between the inlet and expansion chamber. The control body comprises to this end a first seal which co-operates with a seating surface which is arranged upstream of the expansion chamber.

The pressure reducer further comprises an actuating piston arranged axially displaceably in the housing for mechanically actuating the control body. The actuating piston is biased by means of a second spring, in order to displace the control body in the opening direction as a function of the pressure in the expansion chamber and so open the connection between inlet and expansion chamber. The actuating piston defines one side of the expansion chamber, such that the variable internal volume of said chamber is determined by the axial position of the actuating piston. A second seal is provided on the actuating piston, which seal seals the expansion chamber relative to the outside.

The housing is made of plastic and the pressure reducer comprises a special, separately made insert of a suitable material, for example of metal, in particular of brass, or of a suitable plastic, in particular of a glass fiber-reinforced polyamide. According to the invention, the insert is fixed in a seating between inlet and expansion chamber in the plastic housing. The insert comprises a guide bore, which is connected to or communicates with the inlet and supports the control body in axially displaceable manner, and a connecting bore which adjoins the guide bore, which connecting bore is connected to or communicates with the expansion chamber and is of a reduced diameter relative to the guide bore. Thanks to the step between connecting bore and guide bore, the insert accordingly forms an annular shoulder surface which interacts as a seating surface with the first seal on the control body.

Using a valve housing made of plastic, in particular in one piece from injection molded plastic, enables significant cost savings. The special insert constitutes the functionally relevant sealing or seating surface on the high-pressure side which is exposed to elevated loads. Thanks to the insert taking the form of a separately made part, said surface may be produced in the insert inexpensively and with high precision.

In a first development of the invention, the insert may for example be made of metal, in particular of brass. In this development, the annular shoulder surface, which interacts as the seating surface with the first seal on the control body, is formed in the metal. As a consequence, the reliability and quality of a pressure reducer made in the conventional manner, i.e. with an all-metal housing, are substantially achieved.

In another development, the insert made be made from a suitable plastic, in particular a glass fiber-reinforced polyamide, for example with a glass fiber content of approx. 30% or higher. Such glass fiber-reinforced polyamides exhibit very high strength and are therefore also suitable for exposure to elevated pressure loads. Designing the insert as a separately made part also makes it possible simply to replace the insert together with the annular shoulder surface, which interacts as the seating surface with the first seal on the control body, should the seating surface no longer be capable of withstanding elevated pressure loads after extended service.

It should be noted that, on the low-pressure side, the housing plastic may straightforwardly form the sealing surface for the surface sealed by the second seal on the actuating piston, since substantially lower loads prevail on the low-pressure side and any potential leakage is of lesser concern here. The actuating piston itself may also be made of plastic, so reducing costs.

BRIEF DESCRIPTION OF THE FIGURES

A preferred development of the invention is described in greater detail below with reference to the attached figures, in which.

DETAILED DESCRIPTION

Figure 1:
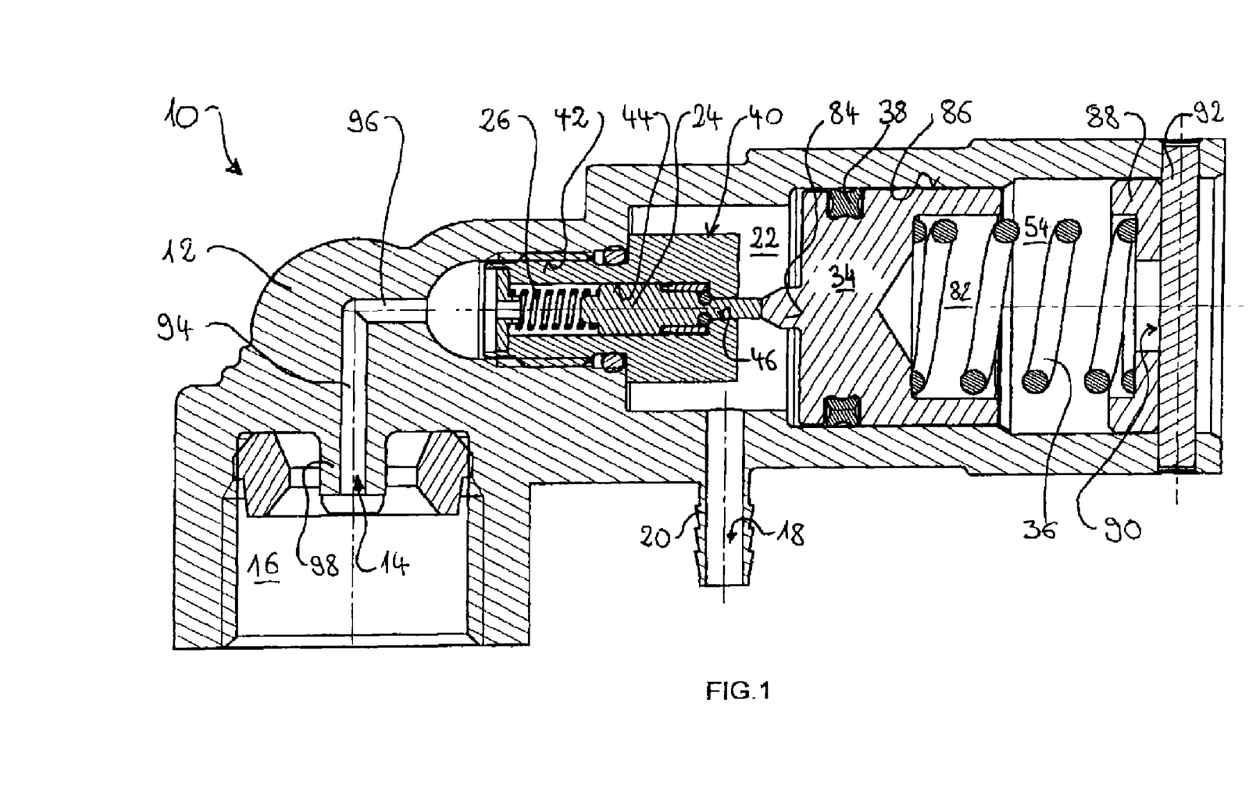
FIG. 1 is a longitudinal section through the housing of a first development of a pressure reducer according to the invention.

FIG. 1 shows a pressure reducer 10 in a central longitudinal section through its housing 12. The pressure reducer 10 was specially developed for use in a device for enriching a liquid with gas, in particular for enriching drinking water with carbon dioxide, as disclosed for example in WO 2009/021960.

The structure of the pressure reducer 10 will first be described. The housing 12 has an inlet 14 with associated inlet port 16 for connecting the pressure reducer 10 to a gas vessel, for example a $CO_2$ cartridge or cylinder. The inlet port 16 may take the form of a threaded bush of metal, not shown in greater detail, inserted into the housing 12 as an axial extension around the inlet 14, which bush is for example screwed together with a carbon dioxide gas vessel. In a preferred embodiment, the inlet port 16 takes the form of an internal thread formed in one piece with the housing 12. The housing 12 furthermore has an outlet 18 with associated outlet port 20 for connecting the pressure reducer 12 on the low-pressure side in particular to a continuous flow mixer for example according to WO 2009/021960. The outlet port 20 on the outlet 18 may, as shown in FIG. 1, take the form of a coupling of the hose/barb type or preferably, in a similar manner to the inlet port 16, the form of a thread (not shown) formed in one piece with the housing 12.

In the housing 12, an expansion chamber 22 is provided the in direction of flow between inlet 14 and outlet 18, in which chamber the gas is expanded from the elevated inlet or storage pressure, typically in the region of approx. 60 bar, to a relatively low pressure suitable for enrichment, typically in the region of 3-5 bar, before it emerges at the outlet 18.

An axially displaceable closing body or control body 24 is arranged in the housing 12. The control body 24 is biased in the closing direction by means of a first spring 26 in order to close a connection between the inlet 14 and expansion chamber 22. As is most clearly apparent from FIG. 2, the control body 24 is provided with a first seal 28, preferably an O-ring seal, which interacts sealingly with a seating surface 32 upstream of the expansion chamber 22. In other words, the connection is sealed off from the inlet 18 when the control body 24 is in the closed position (as shown in FIG. 1).

As shown in FIG. 1, an axially displaceable actuating piston 34 is furthermore arranged in the housing 12, which actuating piston adjusts the axial position of the control body 24. The actuating piston 34 is biased by means of a second spring 36 in order, as a function of the pressure in the expansion chamber 22 and against the action of the first spring 26, to displace the control body 24 in the opening direction, i.e. towards the inlet. Thus, when the pressure is too low in the expansion chamber 22, the connection between the inlet and expansion chamber is opened, since the actuating piston 34 is displaced by the second spring 36 towards the control body 24. The actuating piston 34 thus variably defines one side of the expansion chamber 22, i.e. the variable internal volume of the expansion chamber 22 is determined by the axial position of the actuating piston 34. The actuating piston 34 accordingly has a second seal 38, which seals the expansion chamber 22 relative to the outside.

It should be noted that, according to the invention, the housing 12 is made of plastic in order to make production as inexpensive as possible. The housing 12 is preferably produced from a suitable plastic in one piece, in particular by injection molding. In the light of the typically elevated input pressure of approx. 60 bar, a suitable injection molding polyamide, in particular a polyamide with a breaking stress of >80 MPa at room temperature, is preferred.

Figure 2:
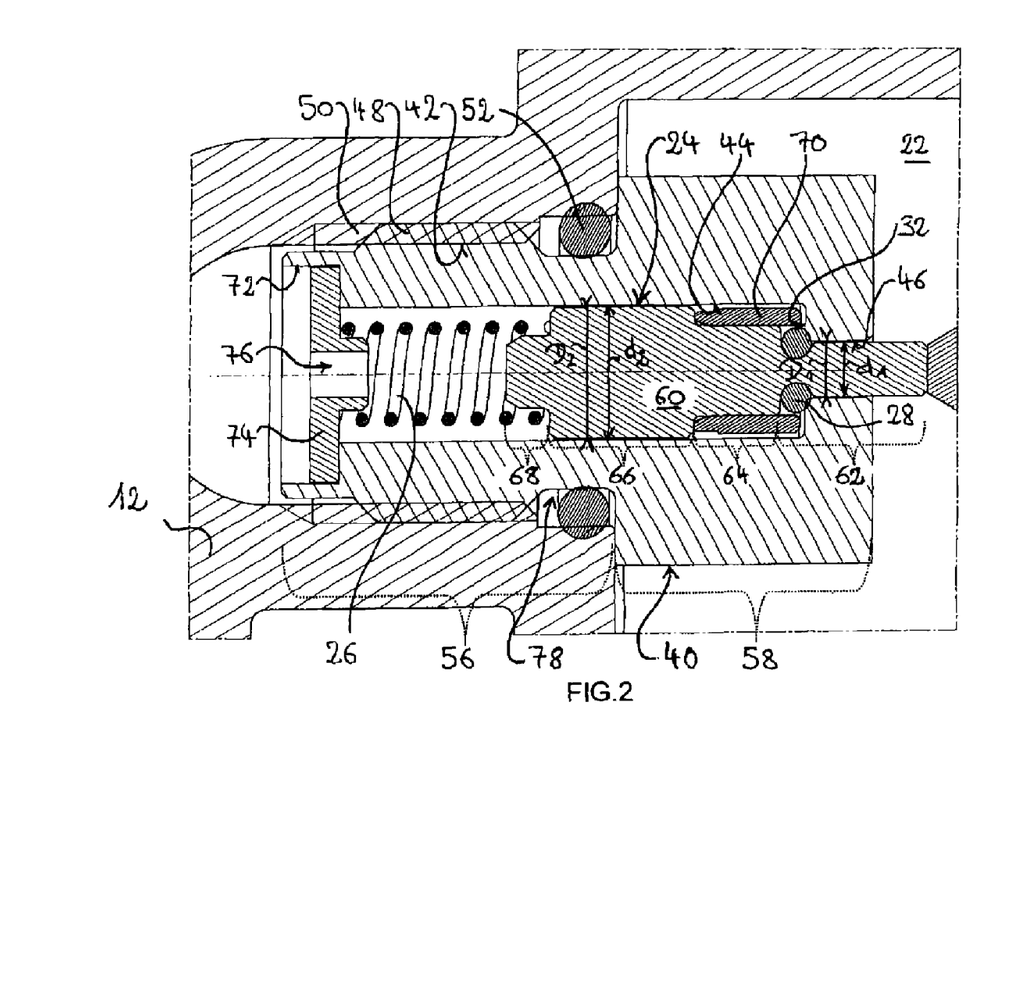
FIG. 2 is an enlarged longitudinal section of an insert used in the pressure reducer according to FIG. 1.

In order to avoid any reductions in quality and safety, the pressure reducer furthermore comprises, as is apparent from FIGS. 1-2, a special insert 40, which, unlike the housing 12, is made in the development shown of metal, preferably of brass. The insert 40 generally has the shape of a bush and, in comparison with the housing 12, has a significantly smaller total volume, i.e. the metal content is dramatically reduced in comparison with a conventional pressure reducer, for example according to EP 0 428 901.

The insert 40 is described in greater detail below. As is most clearly apparent from FIG. 2, the insert 40 is fixed in the housing of plastic in a seating 42 between the inlet and expansion chamber, preferably by a screw connection. A guide bore 44 is provided in the insert 40, which bore is connected to the inlet 14 and supports the control body 24 in axially displaceable manner. A coaxial connecting bore 46 furthermore adjoins the guide bore 44 and opens into the expansion chamber 22. In other words, in the insert 40, the connecting bore 46 forms the sealingly closable connection between inlet 14 and the expansion chamber 22. Relative to the guide bore 44, the connecting bore 46 is of reduced diameter. Thanks to the step between the connecting bore 46 and guide bore 44, the insert 40 forms an annular shoulder surface of metal. This metallic shoulder surface forms the stated seating surface 32, with which the first seal 28 on the control body 24 interacts. The insert 40 accordingly ensures that the seating surface 32, which has a sealing action on the high-pressure side and is exposed to elevated loads, is still made of metal despite the housing being made of plastic. As is furthermore most clearly apparent from FIG. 2, an external thread 48 is provided on the insert, by means of which thread the insert 40 is screwed into a corresponding internal thread 50 in the seating 42. In the variant shown, the external thread 48 and internal thread 50 for example take the form of a metric thread. In order to provide a seal for a connection between the inlet 14 and expansion chamber 22 outside the insert 40, a third seal 52, in particular an O-ring seal, is provided between the metal insert 40 and the plastic housing 12.

As FIG. 1 again shows, the actuating piston 34 is arranged axially displaceably in a cylindrical guide chamber 54 in the housing 12, one end face of which chamber is open to the outside (atmosphere). The seating 42 of the insert 40 opens into this guide chamber 54 and is likewise substantially cylindrical, but has a distinctly smaller internal diameter than the guide chamber 54. As is clear from FIG. 1, the maximum external diameter of the insert 40 is distinctly smaller than the minimum internal diameter of the guide chamber 54. This enables simple assembly of the housing 12 and insert 40, since the insert 40 may be inserted and screwed in through the guide chamber 54. Accordingly, as is apparent in FIG. 2, the insert 40 is provided with a shank portion 56 of smaller diameter, on which the external thread 48 is formed, and a head portion 58 of larger diameter, which preferably has a profile suitable for a screwing tool, for example a standard hexagonal spanner. The step between head portion 58 and shank portion 56 forms a further shoulder surface, which rests as an axial limit stop 60 against a shoulder surface which is formed by the step between the guide chamber 54 and seating 42, so further simplifying assembly.

The control body 24 will now be described in greater detail. FIG. 2 shows an enlarged longitudinal cross-section of the control body 24, which comprises a turned piece 60, i.e. a part produced by turning, made in one piece from metal. The turned piece 60 is cylindrical and multiply stepped, such that it comprises portions with different diameters. It has a first portion 62 at the outlet end of small external diameter d1, a second middle portion 64 of moderate external diameter and a third portion 66 at the inlet end of a larger external diameter d2. The first portion 62 protrudes with radial play, which is slight but sufficiently large to permit the passage of gas, through the connecting bore 46, which is provided with internal diameter D1 in the insert 40. The first portion 62 protrudes through the connecting bore 46, such that it rests against the actuating piston 34. The first portion 62 thus serves as a pin or plunger by means of which the actuating piston 34 can displace the control body 24 axially in the opening direction and simultaneously serves as a radial guide. The first seal 28 is mounted at the transition between the first portion 62 and the second portion 64. The third portion 66 is guided with slight radial play in the guide bore 44, which is provided with internal diameter D2 in the insert 40. An annular cylindrical duct is thus in each case respectively formed between the cylindrical circumferential surfaces of the first and third portions 62 and 66 and the guide bore 44 or connecting bore 46, through which duct gas may flow from the inlet 14 through the connecting bore 46 into the expansion chamber when the control body 24 is not in the closed position. Radial play D1-d1 or D2-d2 which is sufficient both for guiding the control body 24 and for sufficient gas throughput is in the range from 0.02 to 0.2 mm, depending on size. At the inlet end, the turned piece 60 furthermore comprises a fourth portion 68 of smaller diameter, which serves as a radial mount for the first spring 26. At the transition between the first and second portions 62, 64, the first seal 28 is mounted and partially set into a circumferential recess provided there in the turned piece 60. An external thread is provided in the second portion 64, onto which thread is screwed a retaining sleeve 70 for securing the first seal 28 and which partially encloses the seal 28. In this way, in particular when an inexpensive O-ring seal is used, the first seal 28 is reliably protected from excessive deformation and secured in position, so ensuring a log service life. The control body 24 thus comprises just three inexpensive parts, the turned piece 60, the first seal 28 and the retaining sleeve 70 and is simple to make.

As shown in FIG. 2, a seating 72 is provided in the insert 40, in which seating is mounted a first retaining plate 74 with a gas passage 76. The retaining plate 74 forms an immobile support for the first spring 26, which spring-loads the control body 24 in the closing direction. To save costs, the retaining plate 74 is fixed by flanging or deforming the surrounding end region of the insert 40 which forms the seating 72. Furthermore, at the transition between the shank portion 56 and head portion 58, the insert 40 comprises a waist 78 in which the third seal 52 is mounted, such that an inexpensive O-ring seal may reliably be used at this point too. Similarly to the control body 24, the insert 40 may be made as a relatively inexpensive turned part by introducing the guide bore 44, connecting bore 46 and seating 72 as a stepped bore and producing the shank portion 56 with an external thread 48, waist 78 and head portion 58 by turning. As a further relevant processing step, the edge of the seating surface 32 facing towards the guide bore 44 is beveled or chamfered or rounded, in order to avoid damaging the first seal 28 or to increase its service life.

In order to actuate the control body 24, or more precisely to adjust the axial position thereof, the actuating piston 34 is supported in mobile manner in the guide chamber 54. The actuating piston 34 will now be briefly described. Said piston, like the housing 12 itself, is preferably made in one piece made of plastic, in particular as an injection molded part. It comprises a reverse side with a mount 82 for the second spring 36. On the opposite, front, side, the actuating piston 34 has a coaxial extension 84, which rests as a plunger or limit stop against the end face of the pin-like first portion 62. As a result of the opposing spring loads applied by the springs 26, 36, when in normal operation the control body 24 and actuating piston 34 are in contact with one another. Axial displacement of the actuating piston 34 thus results in a corresponding axial displacement of the control body 24. The actuating piston 34 furthermore has a cylindrical external or circumferential surface 86 with a circumferential annular groove for accommodating the second seal 36. The circumferential surface 86 is guided with slight play in the guide chamber 54. A second retaining plate 88 is fixed in the end region of the guide chamber 54 which is located opposite the insert 40. The retaining plate 88 has a gas passage 90 for venting the space between actuating piston 34 and retaining plate 88. The second retaining plate 88 is likewise preferably produced as a plastic injection molded part. The retaining plate 88 forms an immobile support for the second spring 36 such that the latter is mounted between the retaining plate 88 and the seating 82 in the actuating piston 34 and preloads the actuating piston 34 towards the insert 40 or control body 24. The retaining plate 88 is inexpensively fixed by means of a simple cotter pin 92.

In order to provide a complete description of the structure of the pressure reducer 12, the configuration of the housing 12 made of plastic in one piece will be addressed once again. As is apparent from FIG. 1, the housing 12 is of right-angled or bent construction. Such configurations inter alia save space and, when using plastic as the housing material, may be achieved inexpensively. The displacement or center axis of the control body 24 is at right-angles transversely of the center axis of the inlet port 16. On the high-pressure side, the housing 12 accordingly comprises an inlet duct with a first segment 94 and a second segment 96, which are at right-angles to one another. In the corner zone of the segments 92, 96, the housing 12 is provided for reasons of strength with a domed or spherical thickened portion. The second segment 96 opens into a spherically flaring transition to the insert 40. Correspondingly advantageous spherical geometries may be straightforwardly produced using plastic by injection molding. FIG. 1 furthermore shows an opening connection piece 98 provided on the inlet 14, which connection piece is constructed in one piece with the housing 12. The opening connection piece 98 serves to open a connected $CO_2$ vessel, such as for example a user-replaceable gas cartridge. Furthermore, according to FIG. 1 the outlet port is arranged with its center axis transversely of the displacement direction of the control body 24.

Finally, the mode of operation of the pressure reducer will briefly be explained, this mode of operation substantially corresponding to that of the pressure reducer according to EP 0 428 901. For simplicity's sake, dynamic force and pressure influences are not described. In the pressureless state, the control body 24 is held by the actuating piston 34 or the spring 36 in the open position, wherein the seal 28 does not rest against the seating surface 32, such that gas may flow through the connecting bore 46 into the expansion chamber 22. The user connects a gas vessel to the inlet port 16, which is opened by the opening connection piece 98. Gas flows via the duct segments 94, 96 through the insert 40, more precisely through the gas passage 76, the guide bore 44 and the connecting bore 46, along the outside of the control body 24 and into the expansion chamber 22. The second spring 36 and the internal diameter of the guide chamber 54 sealed by the second seal 38 are dimensioned such that, when the desired, reduced outlet pressure in the expansion chamber 22 is reached, for example a pressure in the range from 3-5 bar, the actuating piston 34 moves away from the insert 40, i.e. in the closing direction of the control body 24. The control body 24 thus also moves into the closed position, i.e. until the first seal 28 comes to a stop against the seating surface 32. The first spring 26 serves substantially to effect this closing movement and thus has no substantial control function. As a consequence, the pressure in the expansion chamber 22 again declines on removal of gas through the outlet 18, until the spring load applied to the actuating piston 34 by the spring 36 displaces the actuating piston 34 and thus the control body 24 back in the opening direction and gas again flows from the inlet 14 into the expansion chamber 22. Thus, at equilibrium between the force exerted on the actuating piston 34 by the pressure in the expansion chamber 22 and the opposing force exerted by the spring 36, a desired reduced pressure is established in the expansion chamber 22 i.e. at the outlet 18.

Finally, it should once more be mentioned that, because only very few of the components are made from metal, for example just four to five components (the insert 40, the control body 24 contained therein and the two springs 26, 36 and optionally the cotter pin 92), product costs can be distinctly reduced, both with regard to raw materials and with regard to the necessary processing steps.

Figure 3:
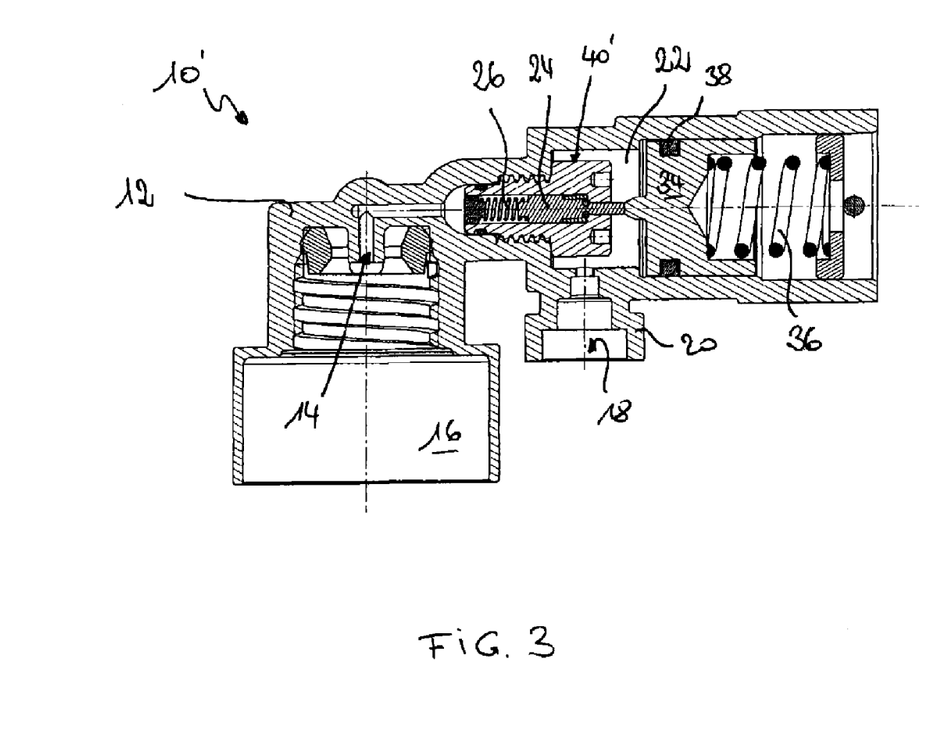
FIG. 3. is a longitudinal section through the housing of a second development of a pressure reducer according to the invention.
Figure 4:
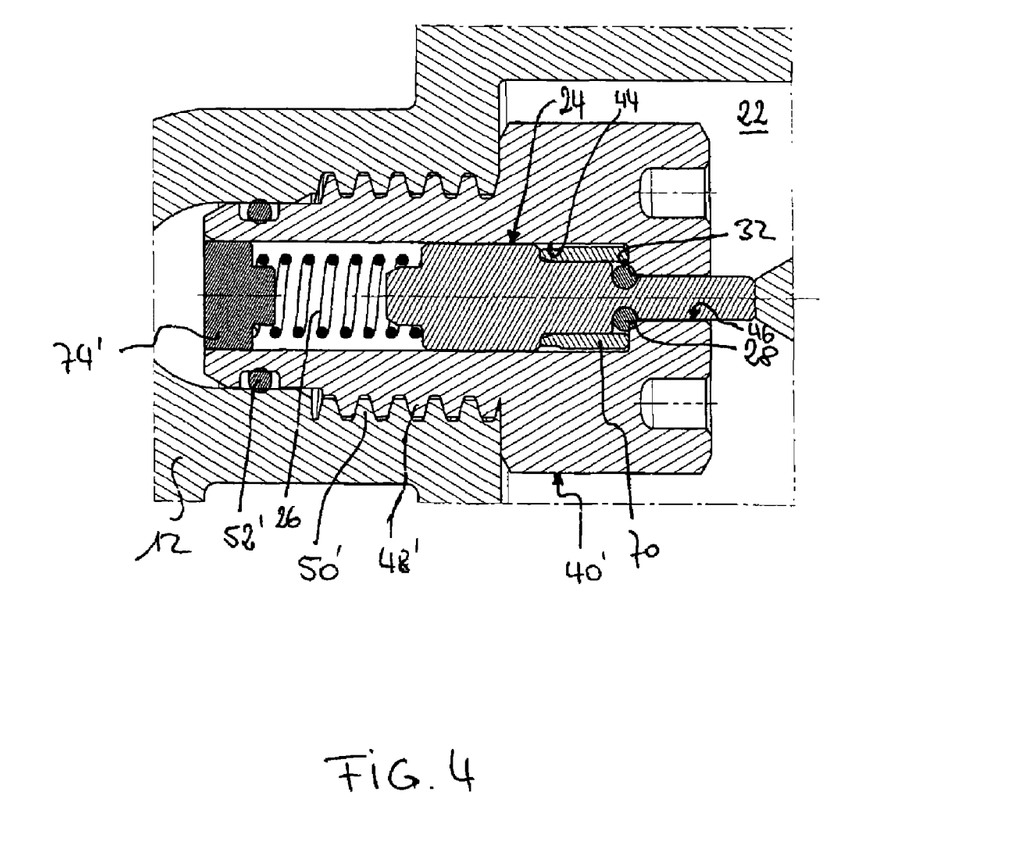
FIG. 4 is an enlarged longitudinal section of an insert used in the pressure reducer according to FIG. 3.

FIG. 3 shows a longitudinal section through the housing of a second development of a pressure reducer 10' according to the invention while FIG. 4 shows an enlarged longitudinal section of an insert 40' used in the pressure reducer 10'. In this development, instead of being made from metal, the insert 40' is made from a suitable plastic. The plastic is for example a glass fiber-reinforced polyamide with a glass fiber content of at least 30%. The insert may for example be made from the same plastic as the housing 12.

The other elements of the pressure reducer 10' are substantially identical to those of the pressure reducer of FIG. 1 and FIG. 2. In particular, in the development of FIGS. 3 and 4, the control body 24 supported in the insert 40' is still made from metal, in order reliably to close the connection between the inlet 14 and expansion chamber 22.

The pressure reducer 10' merely comprises a few relatively small changes in detail which take account of the lower strength of the glass fiber-reinforced plastic (relative to the metal variant). For instance, in the development shown, the external thread 48' and internal thread 50' are for example constructed as trapezoidal threads, so that they can reliably absorb the forces acting on the insert despite the lower strength of the glass fiber-reinforced plastic. Furthermore, the third seal 52' is arranged upstream of the thread 48', 50' in the variant shown. In this development, the area on which the pressure acts on the high-pressure side, is smaller than in the development shown in FIG. 2, such that the forces acting on the thread may be correspondingly reduced.

Furthermore, in the development of FIG. 3 and FIG. 4, the first retaining plate 74' takes the form of a coarse particle filter, for example of a sintered material, which may be pressed into the upstream end of the guide bore 44. Such a sintered filter effectively prevents particles in the gas stream from getting onto the seating surface 32 in the insert 40' and possibly causing damage thereto.

It should be noted that in the development of the pressure reducer 10' with a plastic insert 40' shown in FIG. 3 is preferably provided with a safety device, which, in the event of possible damage to the seating surface 32 in the insert 40' and the concomitant loss of pressure control, responds in order to divert the then elevated inlet or storage pressure away from the expansion chamber 22. Such a safety device may for example be a biased safety device which is arranged at a suitable location in the housing 12 and opens into the expansion chamber 22.

The invention claimed is:

1. A pressure reducer for a device for enriching a liquid with gas comprising:
   a housing made of a plastic material, said housing having an inlet, an inlet port for connecting said pressure reducer to a gas vessel, an outlet, an outlet port for connecting said pressure reducer to a continuous flow mixer, and an expansion chamber for expanding the enrichment gas to a reduced pressure;
   a control body arranged in the housing so as to be axially displaceable in said housing, said control body being biased in a closing direction by means of a first spring so as to close a connection between said inlet and said expansion chamber, and said control body comprising a first seal which co-operates with a seating surface upstream of said expansion chamber;
   an actuating piston arranged in the housing so as to be axially displaceable in said housing, said actuating piston being biased by means of a second spring so as to displace said control body in an opening direction as a function of the pressure in said expansion chamber and thus to open the connection between said inlet and said expansion chamber, wherein the actuating piston delimits one side of the expansion chamber such that a variable internal volume of said expansion chamber is determined by an axial position of said actuating piston, and said actuating piston comprising a second seal which seals the expansion chamber relative to the outside;

wherein said pressure reducer further comprises a separately made insert which is arranged in said housing in a seating between said inlet and said expansion chamber, said insert comprising a guide bore, which is connected to said inlet and which supports said control body axially displaceably, and a connecting bore adjoining said guide bore, said connecting bore being connected to said expansion chamber and said connecting bore being of a reduced diameter relative to the guide bore, such that said insert forms an annular shoulder surface at a step between said connecting bore and said guide bore, said annular shoulder co-operating as a seating surface with said first seal of said control body, wherein a seating is provided in the insert at the inlet end thereof, in which seating is mounted a first retaining plate with a gas passage, which forms an immobile support for the first spring.

2. The pressure reducer according to claim 1, wherein said separately made insert is made of metal, or of a suitable plastic.

3. The pressure reducer according to claim 1, wherein said housing is made in one piece of plastic.

4. The pressure reducer according to claim 1, wherein said insert comprises an external thread, by means of which the insert is screwed into a corresponding internal thread of the seating and wherein a third seal is provided between said insert and said housing.

5. The pressure reducer according to claim 1, wherein said housing is of angled construction, such that a center line of said inlet port and a center line of said outlet port extend transversely of the displacement direction of said control body.

6. The pressure reducer according to claim 1, wherein said inlet port and/or said outlet port takes the form of a thread formed in one piece with the housing.

7. The pressure reducer according to claim 1, wherein said actuating piston is made in one piece and comprises a front end, a rear end and a cylindrical circumferential surface, said rear end being provided with a mount for said second spring, said front end being provided with a coaxial extension, which co-operates with the control body for the displacement thereof, and said cylindrical circumferential surface being provided with a circumferential groove for accommodating the second seal.

8. The pressure reducer according to claim 7, wherein a second retaining plate with a gas passage is mounted in the end of the guide chamber which is opposite to the insert, said second retaining plate being produced as an injection moulded part of plastic, and said second retaining plate forming an immobile support for said second spring, wherein said second spring is mounted between said second retaining plate and said seating in said actuating piston.

9. The pressure reducer according to claim 1, wherein said axially displaceable actuating piston is arranged in a cylindrical guide chamber of said housing, said cylindrical guide chamber being open to the outside, said actuating piston sealing the variable expansion chamber in said cylindrical guide chamber towards the insert, said seating of said insert opens into the guide chamber and is of substantially cylindrical construction with a distinctly smaller internal diameter than the guide chamber, and wherein the maximum external diameter of the insert is smaller than the minimum internal diameter of the guide chamber.

10. The pressure reducer according to claim 9, wherein said insert comprises a shank portion of smaller diameter and a head portion of larger diameter and forms a shoulder surface between the head portion and shank portion, and wherein said shoulder surface rests as an axial limit stop against a shoulder surface which is formed by a step between the guide chamber and receptacle.

11. The pressure reducer according to claim 10, wherein said insert comprises an external thread, by means of which the insert is screwed into a corresponding internal thread of the seating and wherein a third seal is provided between said insert and said housing, wherein the external thread of the insert is provided on the shank portion thereof and wherein the head portion forms a profile suitable for a screwing tool.

12. The pressure reducer according to claim 1, wherein said control body comprises a turned piece made in one piece from metal, with at least a first portion of small diameter at an outlet end, a second middle portion of intermediate diameter and a third portion of a larger diameter at an inlet end, wherein the first portion protrudes with radial play through said connecting bore in said insert and rests against the actuating piston, wherein the first seal is mounted at the transition between the first and second portions, and wherein the third portion is guided with radial play in the guide bore in the insert.

13. The pressure reducer according to claim 12, wherein said turned piece comprises a circumferential recess at a transition between the first and second portions for retaining said first seal and wherein said second portion comprises an external thread, and wherein said control body comprises a retaining sleeve which is screwed onto the external thread in the second portion to secure the first seal.

14. The pressure reducer according to claim 12 wherein said turned piece comprises a fourth portion of a diameter at the inlet end which serves as a radial mount for said first spring.

15. A pressure reducer for a device for enriching a liquid with gas comprising:

a housing made of a plastic material, said housing having an inlet, an inlet port for connecting said pressure reducer to a gas vessel, an outlet, an outlet port for connecting said pressure reducer to a continuous flow mixer, and an expansion chamber for expanding the enrichment gas to a reduced pressure;

a control body arranged in the housing so as to be axially displaceable in said housing, said control body being biased in a closing direction by means of a first spring so as to close a connection between said inlet and said expansion chamber, and said control body comprising a first seal which co-operates with a seating surface upstream of said expansion chamber;

an actuating piston arranged in the housing so as to be axially displaceable in said housing, said actuating piston being biased by means of a second spring so as to displace said control body in an opening direction as a function of the pressure in said expansion chamber and thus to open the connection between said inlet and said expansion chamber, wherein the actuating piston delimits one side of the expansion chamber such that a variable internal volume of said expansion chamber is determined by an axial position of said actuating piston, and said actuating piston comprising a second seal which seals the expansion chamber relative to the outside;

wherein said pressure reducer further includes a separately made insert which is arranged in said housing in a seating between said inlet and said expansion chamber, said insert comprising a guide bore, which is connected to said inlet and which supports said control body axially displaceably, and a connecting bore adjoining said guide bore, said connecting bore being connected to said expansion chamber and said connecting bore being of a reduced diameter relative to the guide bore, such that said insert forms an annular shoulder surface at a step between said connecting bore and said guide bore, said annular shoulder co-operating as a seating surface with said first seal of said control body;

wherein said axially displaceable actuating piston is arranged in a cylindrical guide chamber of said housing, said cylindrical guide chamber being open to the outside, said actuating piston sealing the variable expansion chamber in said cylindrical guide chamber towards the insert, said seating of said insert opens into the guide chamber and is of substantially cylindrical construction with a distinctly smaller internal diameter than the guide chamber, and wherein the maximum external diameter of the insert is smaller than the minimum internal diameter of the guide chamber; and wherein said insert includes a shank portion of smaller diameter and a head portion of larger diameter and forms a shoulder surface between the head portion and shank portion, and wherein said shoulder surface rests as an axial limit stop against a shoulder surface which is formed by a step between the guide chamber and receptacle.

16. The pressure reducer according to claim 15, wherein said insert comprises an external thread, by means of which the insert is screwed into a corresponding internal thread of the seating and wherein a third seal is provided between said insert and said housing, wherein the external thread of the insert is provided on the shank portion thereof and wherein the head portion forms a profile suitable for a screwing tool.

* * * * *